$N_3(n,j)$

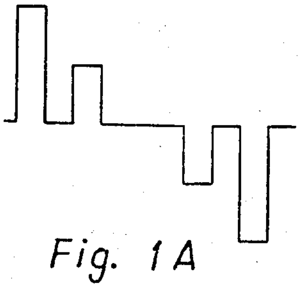
Fig. 1A
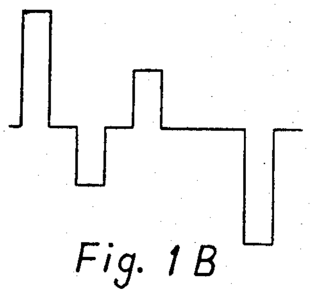
Fig. 1B
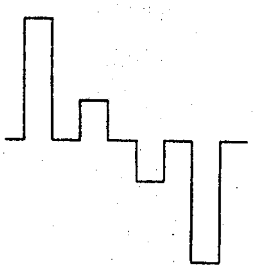
Fig. 2
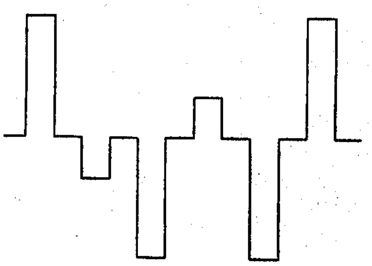
Fig. 3
| BINARY CODE | MULTINARY CODE |
|---|---|
| 0000 | 0 0 0 |
| 0001 | 0 1 -1 |
| 0010 | 1 0 -1 |
| 0011 | 1 -1 0 |
| 0100 | 0 -1 1 |
| 0101 | -1 0 1 |
| 0110 | -1 1 0 |
| 0111 | 0 2 -2 |
| 1000 | 2 0 -2 |
| 1001 | 2 -2 0 |
| 1010 | 0 -2 2 |
| 1011 | -2 0 2 |
| 1100 | -2 2 0 |
| 1101 | 2 -1 -1 |
| 1110 | -1 2 -1 |
| 1111 | -1 -1 2 |
Fig. 5

| n \ j | 0 | 1 | 2 | TOTAL NUMBER |
|---|---|---|---|---|
| 2 | 3 | 2 | 1 | 9 |
| 3 | 7 | 6 | 3 | 27 |
| 4 | 19 | 16 | 10 | 81 |
| 5 | 51 | 45 | 30 | 243 |
| 6 | 141 | 126 | 90 | 729 |
| 7 | 393 | 357 | 266 | 2187 |
| 8 | 1107 | 1016 | 784 | 6561 |
| 9 | 3139 | 2907 | 2304 | 19683 |
| 10 | 8953 | 8350 | 6765 | 59049 |

Fig. 4A $N_4(n,j)$

| n \ j | 0 | 1 | 2 | 3 | TOTAL NUMBER |
|---|---|---|---|---|---|
| 2 | 4 | – | 3 | – | 16 |
| 3 | – | 12 | – | 10 | 64 |
| 4 | 44 | – | 40 | – | 256 |
| 5 | – | 155 | – | 135 | 1024 |
| 6 | 580 | – | 546 | – | 4096 |
| 7 | – | 2128 | – | 1918 | 16384 |
| 8 | 8092 | – | 7728 | – | 65536 |

Fig. 4B $N_5(n,j)$

| n \ j | 0 | 1 | 2 | TOTAL NUMBER |
|---|---|---|---|---|
| 2 | 5 | 4 | 3 | 25 |
| 3 | 19 | 18 | 15 | 125 |
| 4 | 85 | 80 | 68 | 625 |
| 5 | 381 | 365 | 320 | 3125 |
| 6 | 1751 | 1686 | 1506 | 15625 |
| 7 | 8135 | 7875 | 7140 | 78125 |

Fig. 4C $N_6(n,j)$

| n \ j | 0 | 1 | 2 | 3 | TOTAL NUMBER |
|---|---|---|---|---|---|
| 2 | 6 | – | 5 | – | 36 |
| 3 | – | 27 | – | 25 | 216 |
| 4 | 146 | – | 140 | – | 1296 |
| 5 | – | 780 | – | 735 | 7776 |
| 6 | 4332 | – | 4221 | – | 46656 |

Fig. 4D $N_7(n,j)$

| n \ j | 0 | 1 | 2 | TOTAL NUMBER |
|---|---|---|---|---|
| 2 | 7 | 6 | 5 | 49 |
| 3 | 37 | 36 | 33 | 343 |
| 4 | 231 | 224 | 206 | 2401 |
| 5 | 1451 | 1420 | 1330 | 16807 |
| 6 | 9331 | 9156 | 8652 | 117649 |

Fig. 4E

| BINARY CODE | | BINARY CODE | |
|---|---|---|---|
| 00000 | +3-3+3-3 | 10000 | +3-1-3+1 |
| 00001 | -3+3-3+3 | 10001 | -3+1+3-1 |
| 00010 | +3+3-3-3 | 10010 | +3-3-1+1 |
| 00011 | -3-3+3+3 | 10011 | -3+3+1-1 |
| 00100 | +3-3-3+3 | 10100 | +3-1+1-3 |
| 00101 | -3+3+3-3 | 10101 | -3+1-1+3 |
| 00110 | +3-3+1-1 | 10110 | -1+1+3-3 |
| 00111 | -3+3-1+1 | 10111 | +1-1-3+3 |
| 01000 | +3+1-1-3 | 11000 | -1-3+1+3 |
| 01001 | -3-1+1+3 | 11001 | +1+3-1-3 |
| 01010 | +3-1+3-3 | 11010 | -1-3+3+1 |
| 01011 | -1+1-3+3 | 11011 | +1+3-3-1 |
| 01100 | +1-3-1+3 | 11100 | +3+1-3-1 |
| 01101 | -1+3+1-3 | 11101 | -3-1+3+1 |
| 01110 | +1-3+3-1 | 11110 | -1+3-1-1 |
| 01111 | -1+3-3+1 | 11111 | +1-3+1+1 |

Fig. 6

1

3,518,662
DIGITAL TRANSMISSION SYSTEM USING A MULTILEVEL PULSE SIGNAL

Yukio Nakagome, Tokyo-to, and Kitsutaro Amano and Chuichi Ohta, Yokohama-shi, Japan, assignors to Kokusai Denshin Denwa Kabushiki Kaisha, Tokyo-to, Japan, a joint-stock company of Japan Filed Sept. 23, 1966, Ser. No. 581,554
Claims priority, application Japan, Sept. 27, 1965, 40/58,659; Jan. 17, 1966, 41/2,266
Int. Cl. G06f *5/02*; H03k *13/24*
U.S. Cl. 340—347 4 Claims

ABSTRACT OF THE DISCLOSURE

A digital transmission system using a multilevel signal comprising coding means for converting a binary coded signal to be transmitted into a multilevel pulse signal each code word of which is composed of a predetermined number of code elements to transmit the converted multilevel pulse signal into a transmission medium, where each plus element of the code word, as well as each minus element of the code word assumes a level selected from a plurality of possible levels, and an algebraic sum of levels of the code elements included in each of the code words is substantially equal to zero.

This invention relates to a digital transmission system using a multilevel pulse signal, and more particularly to transmission systems of digital information by the use of multilevel pulse signal each pulse of which has a plurality of possible levels.

In a communication system using a pulse code modulated signal (PCM signal), an analogue signal is generally transmitted after being converted to a binary coded signal. If necessary, however, it is possible to convert the analogue signal to a multilevel (more than two levels) pulse signal to transmit the analogue signal. In this case, an amount of transmissible information increases in accordance with increase of the number of the levels of coded-pulse signal. Transmission system using a multilevel pulse signal is useful to apply it to a communication medium, such as coaxial cable, in which a communication signal can be transmitted without disturbance of noise or fluctuation of the characteristic of a transmission medium. Into these transmission lines, transformers are inserted to mutually connect between balanced transmission lines and unbalanced transmission lines or to avoid direct coupling between communication sources and electric sources for repeaters. As a result of said insertion of transformers, such a transmission line cannot usually transmit the D-C component of a communication signal. If a multilevel pulse signal which has very low frequency components and a D-C component is transmitted through such a transmission line, said low frequency components and the D-C component are cut off in the transmission line. Accordingly, the base level of the multilevel pulse signal transmitted is fluctuated to positive polarity or negative polarity. Said fluctuation of the base level causes frequently to occur erroneous detection of the transmitted pulse signal.

An object of this invention is to provide a digital transmission system capable of stably and correctly transmitting a multilevel pulse signal even though a communication medium to be used cannot transmit a D-C component and very low frequency components.

Another object of this invention is to provide a system

2 for coding digital information into a multilevel pulse signal each code word of which has substantially no D-C component.

Said objects and other objects of this invention have been attained by the system of this invention, comprising coding means for converting a binary coded signal to be transmitted into a multilevel pulse signal each code word of which is composed of a predetermined number of code elements, each element of plus polarity of the code word as well as each element of minus polarity of the code word, assuming a level selected from a plurality of possible levels, an algebraic sum of levels and said code elements included in each of said code word being substantially equal to zero, and means for transmitting the converted multilevel pulse signal into a transmission medium, whereby the converted multilevel pulse signal is transmitted, through the transmission medium, without effective fluctuation of base level thereof even if very low frequency components and a D-C component of the transmitted signal are cut off in the transmission medium.

The multilevel pulse signal can be coded in accordance with the present invention so that each pulse of the multilevel pulse signal assumes essentially positive or negative polarity other than zero level, whereby detection of pulses can be correctly carried out without substantial effect of "timing jitter."

The novel features of this invention are set forth with particularity in the appended claims, however this invention, both as to its constitution and operation together with other objects and advantages thereof, may best be understood by reference to the following description, taken in connection with the accompanying drawings, in which the same parts are designated by the same characters, numerals and symbols as to each other, and in which:

FIGS. 1A, 1B, 2 and 3 are wave form diagrams for describing code words of the multilevel signal transmitted through the system of this invention;

FIGS. 4A, 4B, 4C, 4D and 4E are tables for describing the principle of this invention;

FIGS. 5 and 6 are tables for describing the conversion principle of the system of this invention;

Figure 7:
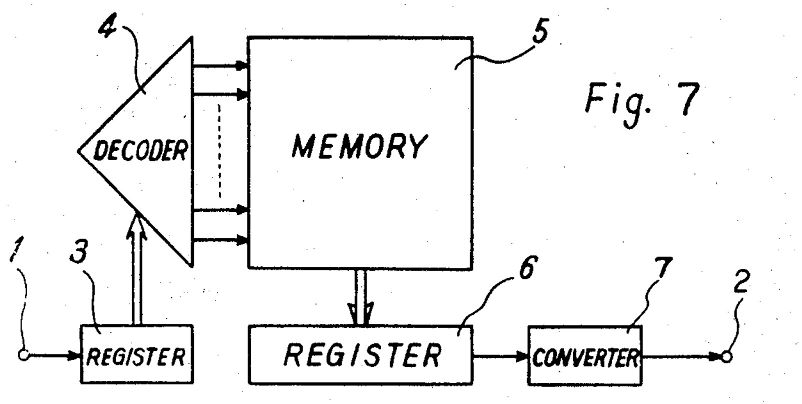
FIGS. 7 and 8 are block diagrams for illustrating embodiments of the coding system of this invention.

Referring to FIGS. 1A to 6, the principle of this invention will be described. In FIGS. 1A and 1B, examples of code words of the multilevel pulse signal to be employed in this invention are shown. Each pulse of the code word has five possible levels (+2), (+1), (0), (−1) and (−2), differences between adjacent levels being the same as to one another. In other words, the plurality of different code element levels have the same value difference therebetween. When the code word of the multilevel pulse signal is composed of a $n$ number of such pulses, the code words are representative of the $5^n$ number of distinct digital information. If $n$ is equal to five, the number of distinct code words is equal to 3125.

If it is assumed that, with reference to code word of $n$ digits which may assume respectively a number $$k(=2m+1)$$

of possible levels $(-m, -m+1 \ldots 0, \ldots m-1, m)$, the number of code words in each of which the algebraic sum of levels of all pulses included into the respective code word is equal to a number $j$ is a number $N_k(n, j)$, the number $N_k(n, j)$ can be indicated as follows:

$$N_k(n, j)=\sum_{i=j-m}^{j+m} N_k(n-1, i), \text{ for } n\geqq 3 \qquad (1)$$

$$N_k(2, i)=k-i, \text{ for } k-i>0 \qquad (2)$$

$$N_k(2, i)=0, \text{ for } k-i\leqq 0 \qquad (3)$$

Said possible levels are established so as to be symmetrical with respect to the base level (zero level), therefore $$N_k(n, j)=N_k(n, -j) \qquad (4)$$

A general solution of the Equation 1 corresponds to a coefficient $x^j$ of expansion of the following expression.

$$(x^{-m}+x^{-m+1}+ \ldots +x^{-1}+x^0+x^1 + \ldots +x^{m-1}+x^m)^n \qquad (5)$$

It is considerably complicated to obtain analytically the general solution $x^j$, but this is obtainable for the given values of the numbers $k$, $n$ and $j$. Results obtained under such conditions (where the number $k$ is equal to 3, 4, 5, 6 or 7, the number $n$ is equal to 2, 3, 4, 5, 6, 7, 8, 9 or 10, and the number $j$ is equal to 0, 1, 2 or 3) are shown in FIGS. 4A, 4B, 4C, 4D and 4E. The last column of each of the tables shows a total number of code words each of which can be constituted by $n$ digits (where "$n$" is the numeral designated in the same line as that of the respective total number).

As shown in FIGS. 4A to 4E, the number of code words in each of which the D-C component is zero so that the algebraic sum $j$ of levels of all the pulses included into the respective code word is equal to zero is considerably less than the total number. By way of example, if the number $n$ of digits is equal to five in case of $N_5(n, j)$ shown in FIG. 4C, the number of code words in each of which the algebraic sum $j$ is zero is equal to 381. With reference to $N_4(n, j)$ shown in FIG. 4B, if the number $n$ of digits is equal to six, the number of code words under the same condition is equal to 580 in the total number 4096 of code words.

In this invention, only $k$-ary code words in each of which each element has one of $k$-possible levels different from one another the algebraic sum $j$ of levels of all pulses included into the respective code word is equal to zero or falls within a narrow range, for example a range (−1, 0, +1), including zero are employed, as "useful" code words, to transmit digital information. In this case, however, "$k$" is an integer more than two. If the number $n$ of digits included into a $k$-ary code word is too small, the number of distinct digital information to be represented by these $k$-ary code words decreases. However, if the number $n$ of digits included into a $k$-ary code word is too large, the ratio of the number of said "useful" code words to the total number of code words decreases. It will be desirable that the number $n$ is about six in case of a quaternary-level pulse signal and about five in case of a quinary-level pulse signal.

To practise the present invention, there must be provided with, at a sending side, a coding means for converting a digital signal into a multilevel pulse signal which is composed of said "useful" code words only. The coded multilevel pulse signal is transmitted and can be decoded into the original digital signal by the use of a decoding means which is provided at a receiving side. In case of application of the system of this invention to a conventional PCM transmission system, it is desirable that an analogue signal to be transmitted is converted to said multilevel pulse signal after being converted temporarily to a binary-pulse signal. Accordingly, the transmitted multilevel pulse signal is decoded to the original analogue signal after being converted temporarily to a binary pulse signal. Since conversion systems for converting an analogue signal into a binary pulse signal or for converting a binary pulse signal into an analogue signal have been proposed and are known by persons skilled in the art, details of these conversion systems are omitted. In the following, examples of systems for converting, in accordance with the present invention, a binary pulse signal into a multilevel pulse signal or a multilevel pulse signal into a binary pulse signal will be described.

A simple system of binary-to-multilevel conversion or of multilevel-to-binary conversion is effected by utilizing conversion tables as shown in FIGS. 5 and 6. As an actual operation of a sending side, said "useful" code words corresponding to the respective binary code words to be transmitted are selected and transmitted to a transmission medium.

FIG. 7 shows an example of the system of this invention in which a binary pulse signal applied to an input terminal 1 is converted into a "useful" multilevel pulse signal described above. This system comprises a register 3, a decoder 4, a memory means 5, a register 6 and a converter 7. The binary coded signal to be converted is applied, through the input terminal 1, to the register 3 which stores temporarily, per each code word, the binary signal. This binary code word stored in the register 3 is then applied to the decoder 4 to select one of $k$-ary codes which are memorized in the semi-permanent memory means 5 in the states of binary codes. By way of example, quaternary levels (−3), (−1), (+1) and (+3) are respectively represented by binary codes (00), (01), (10) and (11). Said selection of the $k$-ary code to be transmitted is carried out in accordance with mutual correspondence between binary codes and $k$-ary codes which are shown in FIGS. 5 and 6 by way of example. The binary code corresponding to the selected $k$-ary code is read out of the memory means 5 and then stored into the register 6. This stored binary code is applied to the converter 7 and converted into the $k$-ary code to be transmitted by the use of the conversion tables shown by way of example in FIGS. 5 and 6 as described above. In accordance with said operation, the $k$-ary codes to be transmitted are successively obtained through an output terminal 2.

Figure 8:
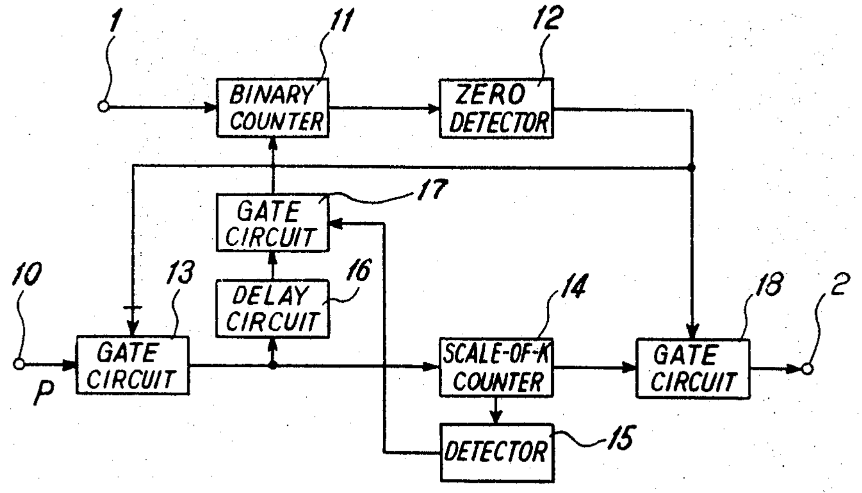

Referring to FIG. 8, another example of the system of this invention in which a binary signal is converted into the "useful" multilevel pulse signal. This system comprises a binary counter 11, a zero detector 12, a gate circuit 13, a scale-of-$k$ counter 14, a detector 15, a delay circuit 16, gate circuits 17 and 18 and a pulse generator (not shown) for applying a pulse train P to a terminal 10. The detector 15 is designed and operated so as to generate a pulse when the absolute value of the algebraic sum $j$ of states of the digits in the counter 14 is equal to or less than the predetermined value. The delay circuit 16 has a small delay time for compensating the detection time of the detector 15.

At an initial condition of the system, the binary counter 11 is reset to the state "00.0" and the scale-of-$k$ counter 14 is rest to its initial condition. A binary code word to be transmitted is applied, through the terminal 1, to the binary counter 11 and stored temporarily therein. The pulse train P supplied from the terminal 10 is applied to the counters 14 and 11 through the gate circuit 13 (and the delay circuit 16 and the gate circuit 17). While pulses of the pulse train P are counted at the counter 14, the binary counter 11 reduces its counting state for each pulse of the pulse train P applied. When the counting state of the binary counter 11 reaches the state "00..0" and this condition is detected by the zero detector 12 then the state of the counter 14 is read out whereby the binary-to-multilevel conversion can be performed.

By way of more definite example of said conversion, the operation of this system where a binary code word of five digits is converted to a quaternary code word of four digits is described in details. In this case, it is assumed that each of the digits of the counter 14 has four possible states (−3), (−1), (+1) and (+3) and the initial condition of states (−3), (−3), (−3) and (−3), that the state of each digit is changed in the order (−3)-(−1)-(+1)-(+3) for each counting of a pulse of the pulse train P, and that a carry of each digit produces at an instant when each digit is changed from the state (+3) to the state (−3). Moreover, the detector 15 detects that the algebraic sum *j* of all digits of the counter 14 is equal to zero. In case where the counter 11 is reset to the state "0000" and the counter 14 is reset to the initial condition of states (−3), (−3), (−3) and (−3), if a binary code "00011" designated in the line 4 of the left column as shown in FIG. 6 is applied to the terminal 1, the binary code "00011" is stored into the counter 11. Pulses of the pulse train P are counted by the counter 14. In this case, since the alegbraic sum *j* of the digits (−3), (−3), (−3) and (−3) of the counter 14 is not equal to zero, an output of the detector 15 is not generated so that the gate circuit 17 is closed. Accordingly, the states of the counter 11 are maintained as they are, but the counter 14 counts successively pulses of the pulse train P. When the digits of the counter 14 reaches states (−3), (−3), (+3) and (+3), the algebraic sum *j* of the digits (−3), (−3), (+3) and (+3) becomes zero. Accordingly, the output of the detector 15 is obtained so that the gate circuit 17 is opened. A first pulse passed through the gate circuit 17 causes to reduce, by "1," the counting state "00011" of the counter 11 and to establish a counting state "00010." However, since this counting state "00010" of the counter 11 is not the state "00000," the zero detector 12 does not produce its output. Accordingly, the gate circuit 13 is maintained in its closed condition so that pulses of the pulse train P are still applied to the counter 14. As the result of receiving the applied pulses, the alegbraic sum *j* of the digits of the counter 14 does not become equal to zero and the output of the detector 15 is not obtained thereby closing the gate 17, which stops pulses applied to the counter 11. After this time, only the counter 14 counts pulses of the pulse train P. When the digits of the counter 14 becomes to states (−3), (−1), (+1) and (−3), the algebraic sum *j* becomes equal to zero again. Accordingly, the gate circuit 17 is opened at this time and the states of the counter 11 is reduced to a state "00001." In this case also, since the state "00001" of the counter 11 is not zero, the pulses of pulse train P is still applied to the counter 14 similarly as described above. When the states of digits of the counter 14 reaches states (−3), (−1), (+3) and (+1) where the algebraic sum *j* is equal to zero, the gate circuit 17 is opened again and a pulse passed therethrough makes the counter 11 to establish a state "00000" thereof. At this time, the zero detector 12 produces its output which makes the gate circuit 13 close and the gate circuit 18 open. In accordance with opening of the gate circuit 18, the states (−3), (+3) and (+1) of digits of the counter 14 is read out through the gate circuit 18 and applied to the output terminal 12. According to said operation, the binary code word "00011" of five digits is converted to the quaternary code word "(−3), (−1), (+3), (+1)" of four digits. Conversion operations of other binary code words can be similarly carried out in this system.

In the above-operation, states of the counter 14 are initially reset to states (−3), (−3), (−3) and (−3). However, the initial condition may be reset to other states, such as states (−3), (−3), (+3) and (+3). The latter case has a shorter time for conversion than that of the former case.

Said four possible states (−3), (−1), (+1) and (+3) of each digit of the counter 14 may be changed respectively to states (0), (1), (2) and (3) which are more generally applicable to conventional *k*-ary counters.

Moreover, if the detector 15 is designed and operated so as to detect that the algebraic sum *j* of digits of the counter 14 is not equal to zero or does fall within a narrow range including zero, the output of the detector 15 is applied to the gate circuit 17 through logical "NOT" operation.

In order to perform said conversion operation of the system shown in FIG. 8 without delay, the periods T of pulses of the pulse train P have to be much shorter than those of the input digital information to be converted. In actual case, the period T is determined under consideration of the total number of code words as shown in the right column of FIGS. 4A to 4E.

The transmitted multilevel pulse signal can be decoded to the binary signal by the use of a decoding system positioned at a receiving side. In case of utilization of "a conversion table," the decoding system can be readily constituted. By way of example, a combination of means as shown in FIG. 7 can be utilized to multilevel-to-binary conversion at the receiving side. In this case, however, the memory means 5 stores binary codes which correspond respectively to the transmitted multilevel codes, and the converter 7 is removed at a position between the input terminal 1 and the register 3 to convert the digits of transmitted multilevel signal to binary code words respectively. Operation of the decoding system can be understood by analogy with operation of the coding system (FIG. 7) described above, details are omitted.

Figure 9:
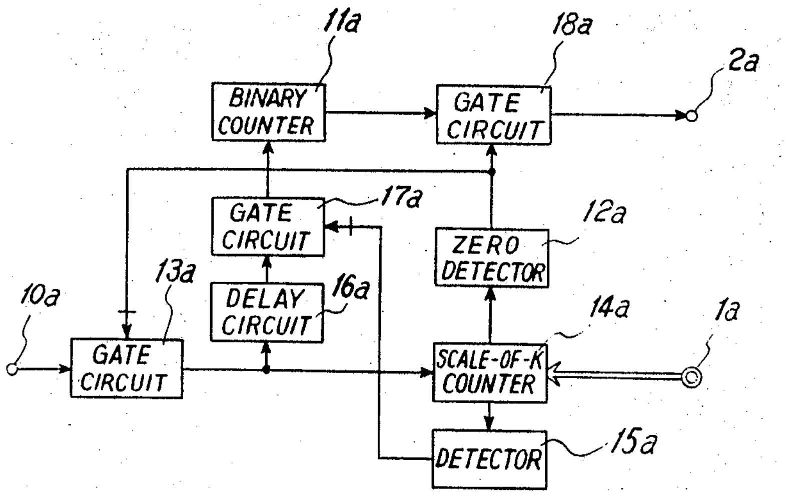
FIG. 9 is a block diagram for illustrating a decoding system employed to receive the multilevel signal transmitted in accordance with this invention.

FIG. 9 shows another example of the decoding system which is like as the system of FIG. 8. In this system, the transmitted multilevel signal is applied to a terminal 1*a* and stored into a scale-of-*k* counter 14*a*. While the binary counter 11*a* is initially reset to a state "000 . . . ," the counting state of the counter 11*a* increases successively by "1" for each receiving of a pulse applied from a gate circuit 17*a*. A zero detector 12*a* detects that the algebraic sum of the states of the counter 14*a* is equal to zero. Other means 10*a*, 13*a*, 15*a*, 16*a* and 17*a* are respectively the same as means 10, 13, 15, 16 and 7. A gate circuit 18*a* is controlled by the zero detector 12*a* and reads out the states of the counter 11*a* to supply them to an output terminal 2*a*. Since operation of this system can be understood on reference to the operation of the system of FIG. 8, details are omitted.

What we claim is:

1. A digital transmission system using a multilevel signal, comprising coding means for converting a binary coded signal to be transmitted into a multilevel pulse signal each code word of which is composed of a predetermined number of plus and minus polarity code elements, each element of plus polarity of the code word and each element of minus polarity of the code word having a level selected from a plurality of possible levels, an algebraic sum of levels of said code elements included in each of said code words being substantially equal to zero, and means coupled with said coding means for transmitting the converted multilevel pulse signal into a transmission medium, said coding means comprising a binary counter for temporarily storing per each code word, the binary coded pulse signal to be transmitted; a first detect means connected to said binary counter for generating an output signal when zero state of the binary counter is detected; a pulse generator for generating pulses which have the same polarity and period as to one another, the period being much less than that of the binary-coded pulse signal; a first gate circuit connected to the output of the pulse generator and passing therethrough pulses from the pulse generator except when the first detect means generates its output signal; a scale-of-*k* counter connected to the output of said first gate circuit for counting pulses passed through the first gate circuit; a second detect means connected to said scale-of-*k* counter for generating an output in response to detection of a condition where an algebraic sum of states of the scale-of-*k* counter falls within a narrow range including zero; a second gate circuit coupled with the output of said first gate circuit for passing therethrough the output pulses of the first gate circuit, after a delay time necessary for performing the detection of the condition by the second detect means, when the second detect means generates its output signal, the output pulses of the second gate means being applied to the binary counter to reduce, by "1" per each application of the output pulses, the states thereof; and means coupled with said scale-of-$k$ counter for taking out the state of the scale-of-$k$ counter only when the first detect means generates its output.

2. A system according to claim 1; wherein said second detect means includes means for generating an output only when said algebraic sum of states of said scale-of-$k$ counter is zero.

3. A system according to claim 1; wherein said coding means includes means for converting said binary coded signal to be translated into a multilevel pulse signal each code word of which is composed of code elements having only a plus or minus polarity.

4. A system according to claim 1; wherein said coding means includes means for providing a plurality of different code element levels having the same value difference therebetween.

References Cited

UNITED STATES PATENTS

| | | | |
|---|---|---|---|
| 2,700,696 | 1/1955 | Barker | 178—2 |
| 3,105,143 | 9/1963 | Hosier et al. | 340—172.5 X |
| 3,264,615 | 8/1966 | Case et al. | 340—172.5 |
| 3,268,875 | 8/1966 | Schaffer | 340—172.5 |
| 3,389,380 | 6/1968 | Ashbaugh et al. | 340—172.5 |

OTHER REFERENCES

Irwin, W. C.: Digital Computer Techniques (pp. 218–223, FIGS. 33–1, 33–2 relied on), Van Nostrand Co., New York, 1960.

MAYNARD R. WILBUR, Primary Examiner

G. R. EDWARDS, Assistant Examiner

U.S. Cl. X.R.

235—154